Oct. 15, 1968
B. W. BRUNSON
3,405,680
DUSTING MACHINE
Filed Aug. 15, 1966
2 Sheets-Sheet 1
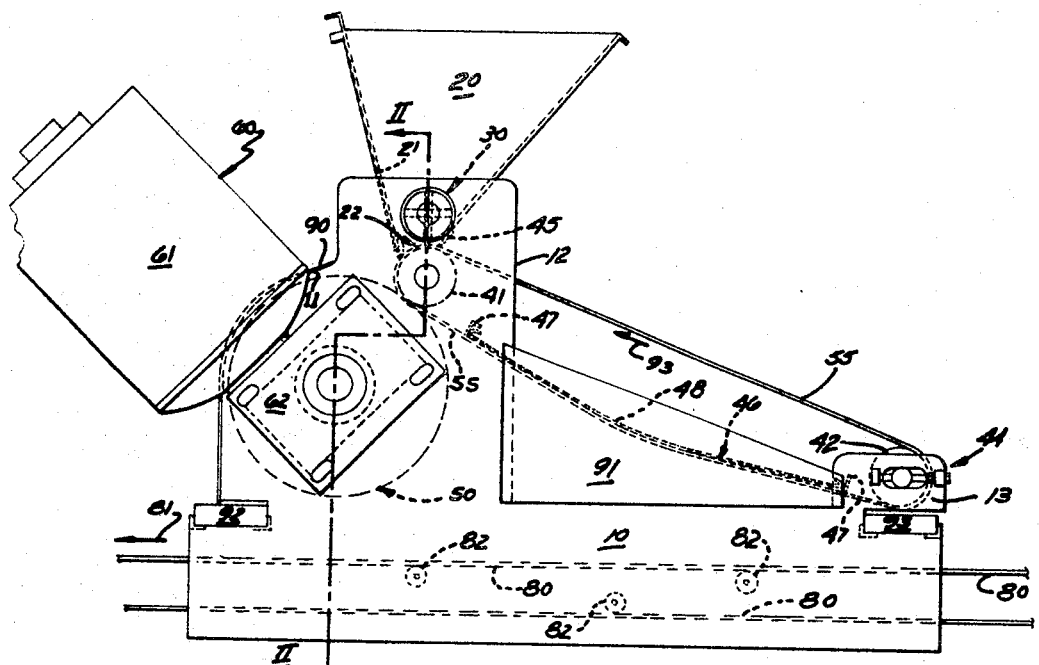
FIG. 1.
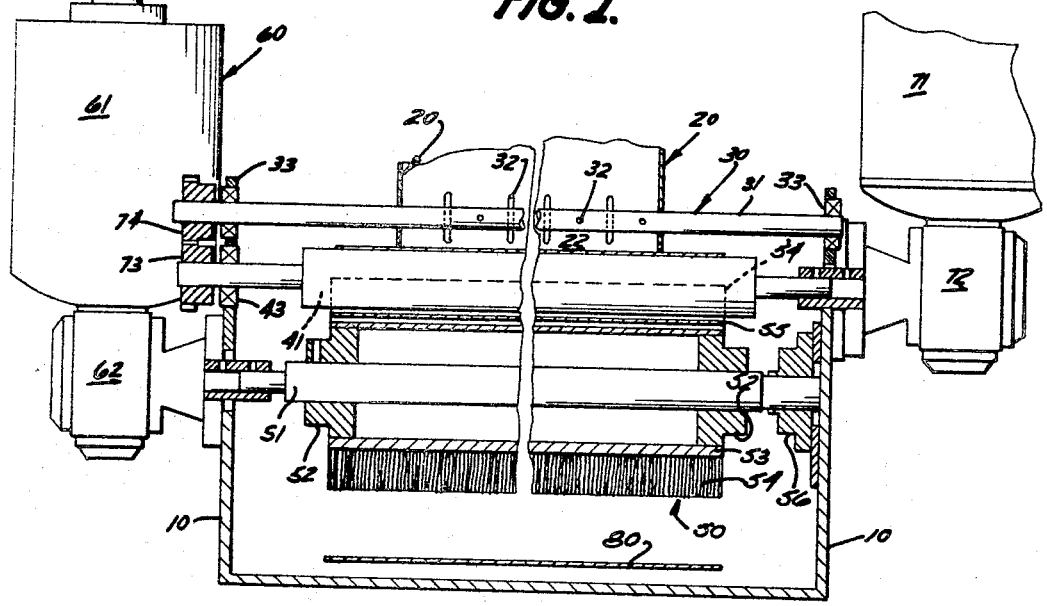
FIG. 2.
INVENTOR.
BRUCE W. BRUNSON
BY 
ATTORNEYS

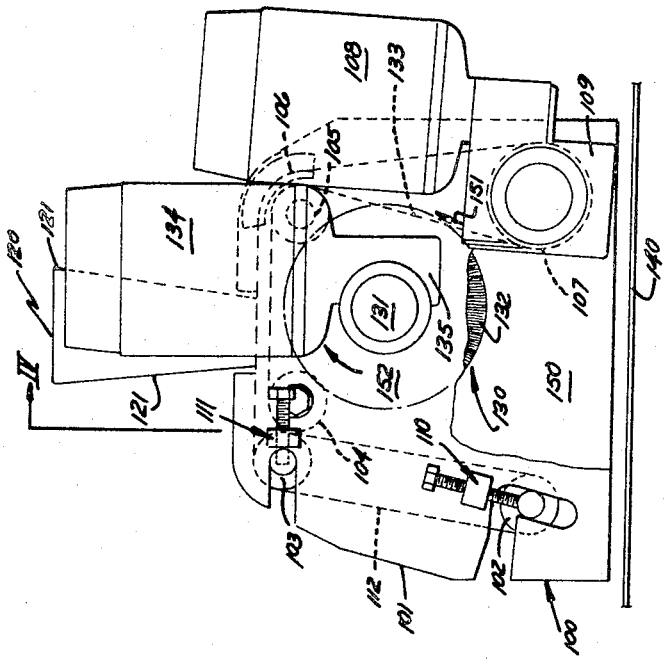
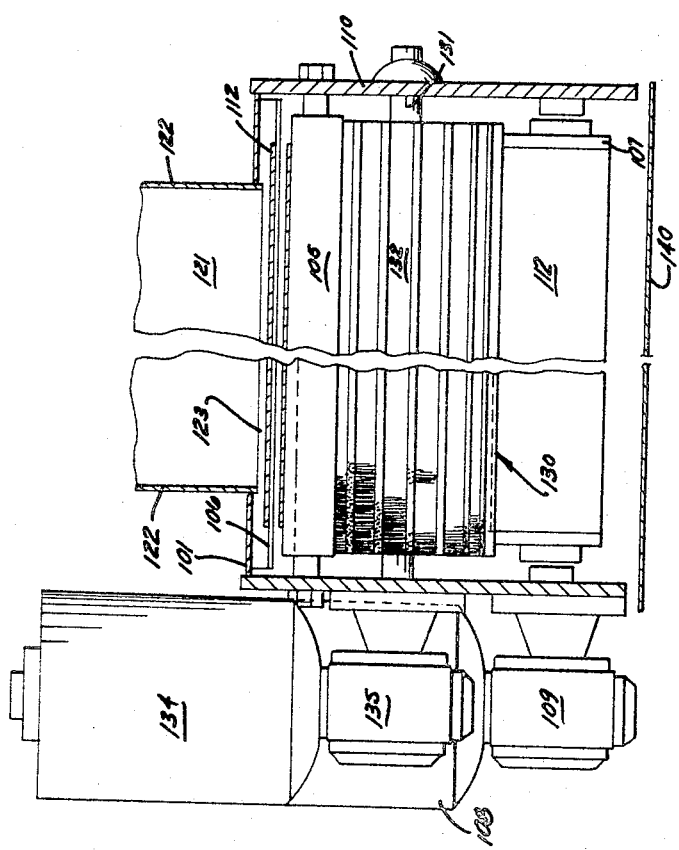

3,405,680
DUSTING MACHINE
Bruce W. Brunson, Grand Rapids, Mich., assignor to Werner Machinery Company, Grand Rapids, Mich., a corporation of Michigan
Filed Aug. 15, 1966, Ser. No. 572,575
3 Claims. (Cl. 118—24)

ABSTRACT OF THE DISCLOSURE

A dusting apparatus for articles being carried on a conveyor, such apparatus including means for supplying dusting material onto an endless belt which carries the material downwardly onto a rotatable brush which is rotating to scatter or distribute the dusting material in a direction underneath the return portion of the endless belt which serves as a shroud positioned over the conveyor means. This arrangement provides for a continuously moving shroud which is cleaned off by the rotating brush and thus eliminates caked dusting material from accumulating on the shroud and eventually falling on the articles on the conveyor.

---

This invention relates to dusting machines and, more particularly, to dusting machines particularly adapted for dusting bakery goods with flour, sugar and other types of finely granulated material.

Prior art dusting machines generally comprise an enclosure through which the goods to be dusted pass on a conveyor belt. Means such as a hopper are provided for storing the dusting material and passing it selectively onto the outer surface of a rotating distributor which is mounted within the housing, usually above the conveyor belt. As the granulated material strikes the rotating distributor, it is centrifugally hurled in cloud-like patterns towards the moving belt on which the goods to be dusted are positioned.

Because of the cloud-like nature of the dusting material as it leaves the distributor means, it is necessary that the enclosure surround, as nearly as possible, the goods being dusted at any particular moment. Otherwise, the dust will escape from the machine and render the surrounding environment unsuitable for working. In the past such enclosures have been fabricated in several different manners. For example, some are made completely from sheet metal while others have sheet metal sides and a fabric-type top. Regardless of the type of material utilized, the marked tendency of the cloud-like formation of granulated particles to cling to any surface with which they come in contact has not been reduced materially. Thus, at frequent intervals, it is necessary to elevate the enclosure and clean the caked dusting material therefrom.

Perhaps even more important than the relatively frequent cleanings necessitated by the prior art devices is the fact that the dusting material will cake or accumulate on the shroud which is positioned above the conveyor belt and then fall onto the goods being dusted in chunk-like particles, thus rendering them unfit for packaging and commercial distribution. For example, the dust material may cake on the upper shroud in irregular thicknesses and be discharged therefrom by a sudden and unintentional jolt to the machine. It will, of course, fall directly onto the goods which are then in the process of being dusted rendering them unsuitable for packaging and distribution. Similarly, changes in temperature and humidity may cause the caked material to fall from the upper shroud.

It is an object of this invention to provide a dusting mechanism which is not subject to those disadvantages outlined above which have plagued the prior art and the entire baking industry.

More particularly, it is an object of this invention to provide a dusting machine wherein the dusting material will not be allowed to cake on the upper shroud of the enclosure, and thus not be allowed to fall onto the goods being dusted rendering them commercially useless.

It is an object of this invention to provide a dusting machine employing an upper shroud which is automatically periodically cleaned during the regular operation of the machine.

More particularly, it is an object of this invention to provide a dusting machine wherein the rotating dust distributor is utilized to periodically wipe the upper shroud clean of clinging dusting material and thus prevent caking on the surface thereof.

These and other objects of this invention will be clearly understood by reference to the following specification and accompanying figures in which:

FIG. 1 is a side-elevational view of the dusting machine;

FIG. 2 is a cross-sectional view taken along line II—II of FIG. 1;

FIG. 3 is a side-elevational view of a modified dusting machine; and

FIG. 4 is a cross-sectional view taken along line IV—IV of FIG. 3.

Briefly, this invention comprises a dusting enclosure which has its upper surface formed by the lower side of an endless belt which is rotatably mounted such that continuously different sections thereof are sequentially exposed to the dusting material. Means are provided along the length of the belt travel to clean any accumulated dusting material therefrom. Preferably, the cleaning means comprises the dust distributor which is so positioned as to laterally contact succeeding segments of the endless belt, and thus brush away any minute particles of dusting materials which have begun to cake thereon.

Referring now to the figures, a preferred embodiment of this invention along with one modification thereof will be described in detail. FIGS. 1 and 2 show a dusting machine having a pair of side plates 10, a rounded back section 11, upstanding roller support sections 12 and L-shaped rear sections 13 which form the vertical structural support members. A conventional hopper 20 having an elongated slide valve 21 is supported at the top of the side plates 10 in any well-known manner. Hopper 20, as is well-known in the art, serves as a storage area for the dusting material. As will be seen in FIG. 2, the discharge throat of hopper 20 is preferably slightly less than the width of the conveyor belt 80 upon which the goods to be dusted are positioned, eliminating any possibility of caking on the lateral extremities of belt 55.

Mounted within the discharge throat 22 of hopper 20 is a conventional agitator assembly 30 which, as is well-known in the art, serves to prevent plugging of the hopper discharge throat 22. The agitator assembly 30 consists of a shaft 31 which is suitably borne by bearings 33 in side plates 10. That section of shaft 31 which passes through the discharge throat 22 of hopper 20 has a plurality of radially extending agitators 32 affixed thereto. As these agitators rotate, any lumps in the dusting material which might otherwise plug the discharge throat will be broken, thus assuring an even flow of dusting material from hopper 20.

Mounted directly below the discharge throat 22 of hopper 20 and extending rearwardly therefrom is movable shroud assembly 40. The movable shroud assembly consists of a drive roller 41, and an idler roller 42 which are mounted at the position shown best in FIG. 1 by conventional bearing means 43 into side plates 10. Conveniently, a conventional tension adjustment assembly 44 may be incorporated at the idler roller mount so as to allow adjustment of the tension on endless belt 55 which is mounted for conveyor-type movement about rollers 41 and 42. A cleaning blade 45 is affixed to the discharge throat of the hopper as indicated at FIG. 1 to insure that no undesirable materials pass into the dusting mechanism on the return travel of belt 55. This blade extends across and contacts the entire width of belt 55.

A back plate 46 having a convex section 48 is supported between side plates 10 by means of retention channels 47. These channels, and the back plate supported thereby extend completely across the space between side plates 10. Concave section 48 of back plate 46 serves to place a resilient tension on belt 55 to insure that it does not become undesirably loose during utilization of the machine. Convex section 48 additionally, as will become apparent hereinafter, serves to further insure that the dusting material will not collect on belt 55.

Mounted below and to the left of drive roller 41 (see FIG. 1) is the distribution brush assembly 50. This assembly consists of an axle 51 having a pair of hubs 52 mounted at each end thereof by conventional keying mechanisms. Shaft 51 is rotatably supported between side plates 10 by bearing means 56 and the input of right angle drive 62. A cylindrical brush support housing 53 is mounted to the periphery of hubs 52. Brush support housing 53, as is well-known in the art, contains a large number of bristles 54 which extend in radial fashion therefrom.

By reference to FIG. 1, it will be noted that the spatial relationship of drive roller 41, hopper 20 and distribution brush 50 is such that (1) the dusting material falls onto the upper surface of movable shroud 55 immediately prior to its encircling drive roller 41, and (2) distribution brush 50 is positioned such that its outer brush-like periphery contacts movable belt 55 as it corners around drive roller 41 immediately prior to its trip through the dusting enclosure. This arrangement insures that any dusting material which begins to collect on movable shroud 55 will be brushed therefrom once each revolution as that particular section of the shroud comes into contact with rotating distribution brush 50.

Cylindrical distribution brush 50 is driven by driving assembly 60 which consists of a motor 61 and a conventional right angle drive 62. Similarly, rotational thrust is applied to drive roller 41 and agitator 30 by means of a conventional motor 71 and right angle drive 72. A pair of mating gears 73 and 74 transmit the rotational thrust of motor 71 from drive roller 41 to agitator assembly 30.

The remainder of the dusting enclosure is formed by a curved hood 90 which passes around the peripheral surface defined by rounded back sections 11 of side plates 10, and a pair of sheet metal side hoods 91 which may be mounted to side plates 10 by any conventional means.

The conveyor band 80, upon which the goods to be dusted are positioned, travels through the enclosure in the direction indicated by arrow 81. If necessary, this band may be supported along its forward and return pass by conventional idler rollers 82 suitably borne by side plates 10 or extensions thereof within the dusting enclosure. As the goods pass into the dusting enclosure on conveyor belt 80, valve 21 is opened so as to allow flour or other material to flow from hopper 20 onto the terminating edge of movable shroud 55. This shroud moves in the direction indicated by the arrows 93 and thus, shortly after dropping thereonto, the dusting material comes into contact with the bristles of rotating distributor brush 50. The centrifugal action of brush 50 which rotates clockwise as viewed in FIG. 1 transforms the dusting material into a cloud-like dust which settles upon the goods passing on the conveyor belt 80. The relative opening of valve 21 and the relative speed of conveyor belt 80 will determine the amount of dusting material placed on each item as it passes through the dusting machine.

That portion of the dust which clings to shroud 55, and which in prior art devices has caked until such time as it fell on the goods, will not cake on the movable shroud disclosed in the present invention. As the dusting process is taking place, shroud 55 is continually rotating and the larger cakings of dusting material are sequentially removed by knife 45. Initial buildup is removed each belt revolution by the contact of cylindrical distributor brush 50 with movable shroud 55. Thus, each time a section of shroud 55 comes into contact with cylindrical brush 50, any material thereon will be redistributed within the dusting enclosure and caking prevented.

A pair of slidable trays 92 and 93 are provided preferably laterally adjacent the front and rear sections of the dusting enclosure as shown in FIG. 1. Tray 92 catches any dusting material which is hurled against back plate 90 by distributor assembly 50 while tray 93 catches any dusting material which falls from moving shroud 55 as it passes around idler 42. These trays must, of course, be periodically removed and emptied.

Referring now to FIGS. 3 and 4, a modified embodiment of this invention will be described. In this embodiment, the moving shroud surrounds the rotating distributor assembly on three sides and, thus, completely eliminates the possibility of any dusting material caking on the apparatus and falling onto the goods being dusted. The support assembly 100 comprises a pair of uprights 101 within which are journaled idler rollers 102, 103, 104, 105 and drive roller 107. A suitable band slide 106 also extends between upright supports 101. In actual operation, of course, means are provided for maintaining the dusting assembly in elevated relationship with respect to the conveyor 140 upon which the goods to be dusted travel. These means might, for example, comprise a pivotable mounting at one end of the dusting machine whereby it could be swung into and away from operative relationship with conveyor 140.

The movable shroud 112 traverses the drive and idler rollers and the band slide in the manner indicated in FIG. 3. Conveniently, suitable tension adjusting means 110 and 111 may be provided to facilitate installation of the shroud and to enable maintenance of proper tension thereon during operation. The shroud is rotated in endless fashion by means of drive roller 107 which is propelled by a motor 108 connected thereto by a conventional right angle drive assembly 109.

Mounted at the top of the dusting machine is a hopper assembly 120 comprising front and rear converging panels 121 and side panels 122. Hopper 120 has its discharge throat 123 positioned closely adjacent the surface of movable shroud 112 whereby the material flowing therefrom will be deposited onto the shroud. If necessary, suitable means such as those shown in FIGS. 1 and 2 may be provided in the discharge throat of hopper assembly 120 to prevent clogging and to control the flow of material onto the belt. The need for components of this type is substantially reduced by the embodiment shown in FIGS. 3 and 4 since the discharge throat of the hopper may be relatively wide as viewed in FIG. 3 and the flow of material controlled by its position relative to movable shroud 112.

The distributor assembly 130 comprises a shaft 131 having a cylindrical brush 132 mounted for rotation therewith. Cylindrical brush 132 is positioned between uprights 101 such that a section of its periphery contacts movable shroud 112 at 133. Rotating brush 132 is driven by means of a conventional motor 134 and right angle drive assembly 135.

In operation, the goods to be dusted are placed upon conveyor belt 140 which carries them beneath the dusting assembly and into the dusting cavity 150 (see FIG. 3). Motors 134 and 108 rotate such that brush assembly 132 and movable shroud 112 traverse in the direction indicated by the arrows 152 and 151 respectively. The dusting material flows from hopper 120 onto the upper reach of movable shroud 112. From this point it is carried by the moving shroud around band slide 106, around drive roller 107 and into contact with rotating cylindrical brush 132. The brush sweeps the material from the moving shroud and causes it to form a cloud-like formation within dusting chamber 150. The dusting material settles from this formation onto the goods being processed.

Since the shroud is contacted by the brush during each revolution thereof, there is no tendency for the dusting material to build up or cake thereon and subsequentially fall in cakes onto the goods being dusted. If necessary, a suitable overflow tray may be provided beneath drive roller 107 to insure that the material will not fall from the moving shroud 112 onto the goods prior to the time that it has been swept into the desired cloud-like formation by the contact of rotating brush 132. If, however, proper tolerances are derived for the positioning of hopper 120 with respect to shroud 112 for the particular dusting material being utilized, this is seldom necessary.

While a preferred embodiment of this invention has been described in detail along with one modification thereof, it will be apparent to those skilled in the art that many other modifications may be made without departing from the spirit and scope of this specification. Such modifications are to be considered as included in the following claims unless these claims, by their language, expressly state otherwise.

I claim:

1. A dusting apparatus comprising:

a pair of spaced upstanding supports;

conveyor means traversing between said supports;

a rotatable brush distributing means mounted on said supports above said conveyor means and generally perpendicular to the path of movement thereof;

means for supplying dusting material through an opening in a housing located above said brush distributing means;

a moving endless belt positioned above said conveyor means and providing a shroud thereabove, means for driving said belt;

said endless belt being arranged to pass under the said opening and downwardly into engagement with said rotatable brush distributing means at a position such that the dusting material cannot fall downwardly without directly falling on said brush distributing means;

means for rotating said brush distributing means in a direction such that its peripheral portion engaging said belt is moving in the same direction as said belt whereby the dusting of articles on said conveyor means is accomplished directly underneath a major portion of said belt;

said rotatable brush distributing means providing a means for periodically cleaning accumulated dusting material from the belt before it can fall directly on articles carried on said conveyor means; and side enclosure members forming in conjunction with said belt on enclosed chamber in which articles on said conveying means are dusted.

2. The combination as set forth in claim 1 in which the shroud formed by said endless belt is inclined downwardly toward said conveyor means.

3. The combination is set forth in claim 1 wherein said brush distributing means is generally circular in cross section and wherein said endless belt is mounted on at least two belt supporting rollers and one of said belt rollers is mounted above the axis of rotation of said brush distributing means and adjacent thereof whereby said brush distributing means brushes against said belt as said brush distributing means is rotated.

References Cited

UNITED STATES PATENTS

| | | | |
|---|---|---|---|
| 1,643,143 | 9/1927 | Wilcox | 118—308 X |
| 3,036,931 | 5/1962 | Kell | 118—323 X |

CHARLES A. WILLMUTH, *Primary Examiner.*

JOHN P. McINTOSH, *Assistant Examiner.*